Aug. 18, 1959  A. W. WOODWARD  2,900,016
RIM FLANGE SUPPORTED TIRE REMOVING TOOL
Filed Nov. 9, 1955  2 Sheets-Sheet 1

INVENTOR.
ALVA W. WOODWARD
BY
R. L. Miller
ATTORNEY

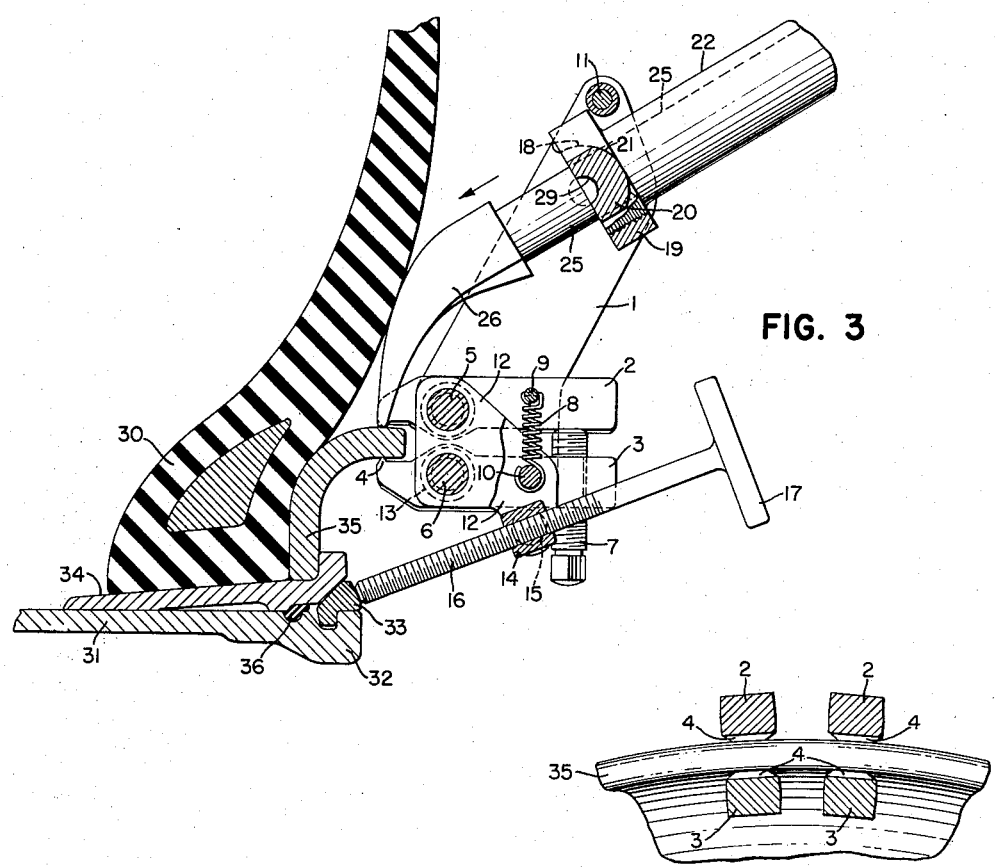
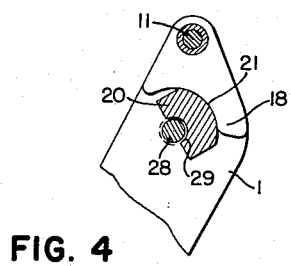
FIG. 3
FIG. 5
FIG. 4
INVENTOR.
ALVA W. WOODWARD

United States Patent Office 2,900,016
Patented Aug. 18, 1959

2,900,016

RIM FLANGE SUPPORTED TIRE REMOVING TOOL

Alva W. Woodward, Kent, Ohio, assignor to The Goodyear Tire & Rubber Company, Akron, Ohio, a corporation of Ohio Application November 9, 1955, Serial No. 545,866

4 Claims. (Cl. 157—1.17)

This invention relates generally to an apparatus for removing tires from a rim and more particularly to a tool for displacing the bead of a mounted tire from the bead seat.

In the repair of large tires, such as are used in heavy-duty equipment, it is frequently necessary to remove the tire from the rim. The initial step to effect removal necessitates dislodging the tire bead from the rim bead seat which is very difficult if not impossible by the usual techniques.

The general object of this invention is to provide a tool to effect such dislodgment that is economical of design, simple in operation, and efficient in use.

A further object of this invention is to provide a tool that is portable and self-contained.

Other objects and advantages of this invention will become apparent hereinafter as the description thereof proceeds; the novel features, arrangements, and combinations being clearly delineated in the specification, as well as in the claims thereunto appended.

In the drawings:

Fig. 3 is a sectional view of the tool of the invention taken along the line 3—3 of Fig. 2 and shows the tool of the invention positioned on a rim at the start of the operation.

Fig. 4 is a fragmentary sectional view of a detail of the hydraulic ram swivel joint; and Fig. 5 is a fragmentary sectional view taken along the line 5—5 of Fig. 1.

Figures 1, 2:
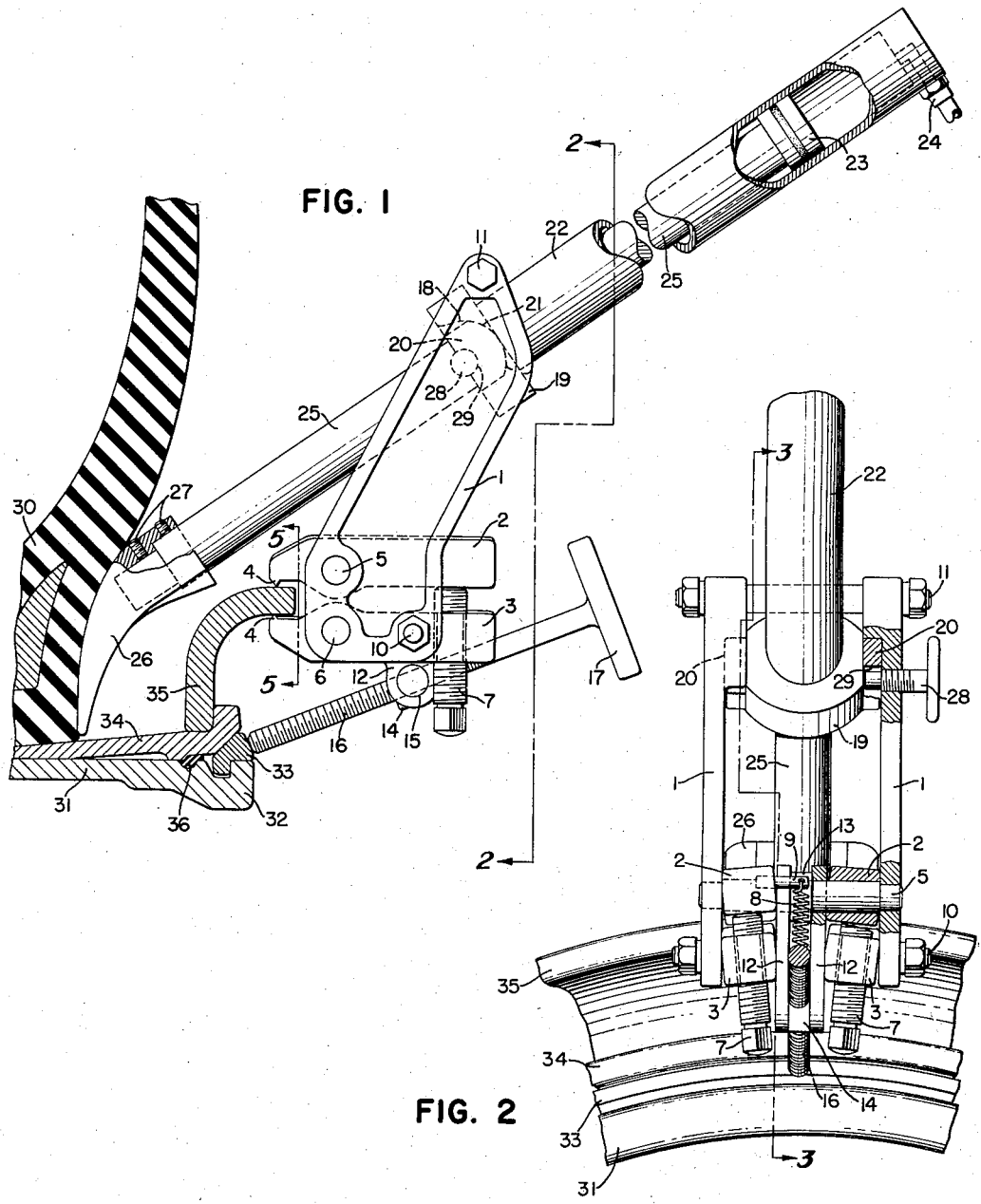
Fig. 1 is a side view of the tool of the invention positioned on a rim with the tire bead partly dislodged.
Fig. 2 is a sectional view of the tool of the invention taken along the line 2—2 of Fig. 1.

In the drawings, two oppositely spaced side plates 1 have mounted therebetween two similar pairs of rim clamp jaws. Each pair of rim clamp jaws includes an upper jaw 2 and a lower jaw 3 with a chisel-point edge 4 formed on one end of each jaw member. The jaws 2 and 3 are mounted between the side plates 1 on hinge pins 5 and 6 passing through the jaws 2 and 3 respectively, so that the chisel-point edges 4 of the jaw members 2 are in spaced opposed relation to those of jaw members 3, for purposes which will become apparent hereinafter. On the opposite end of each of the jaw members 2 and 3, adjustment jack screws 7 engage a threaded opening in the lower clamp jaws 3 so as to bear against the upper jaws 2 as shown. Thus as the screws 7 are rotated to move inwardly, the jaw members 2 are moved away from jaw members 3 at that end, thus moving the chisel-point edges 4 of each pair of jaws toward each other. Conversely the opposite action takes place as the screws 7 are moved outwardly. In order to provide for efficient operation of the tool, it is desirable that the upper jaw 2 and the end of the screw 7 be maintained in contact. As shown, a tension spring 8, anchored at one end to a pin 9 and at the other end to a bolt 10 passing through the side plates 1 and lower jaw members 3, urges the upper jaw members 2 against the ends of screws 7. The bolt 10, a spacer bolt 11, and hinge pins 5 and 6 maintain the spacing between the two side plates 1.

As shown, the jaw members 2 and 3 are mounted on the hinge pins 5 and 6 so that the surface of the chisel-point edges 4 of one pair are at an angle with those of the other pair. As seen in Fig. 5, the angular relation between the pairs of jaw edges 4 provide a more firm grip on the rim when the tool is being used. The angle is such that edges generally correspond with the curvature of the rim. When the jack screws 7 are tightened sufficiently the entire width of the chisel point edges 4 are in engagement with the rim without a substantial depth of bite at any point.

Two support plates 12 are shown between the pairs of clamp jaws, and which, as can be more readily seen in Fig. 3, are positioned by hinge pins 5 and 6 and the bolt 10. Spacers 13 on the hinge pins 5 and 6 and bolt 10 maintain the spacing between the support plates 12.

At the lower extension of the support plates 12 and below the spacer bolt 10, a threaded block 14 is pivoted therebetween by pin extensions 15 on the block 14. A long screw shaft 16 having a T-handle 17 at one end thereof passes through the threaded opening in the block 14, the purpose of which will become apparent as the description proceeds.

An inwardly extending arcuately shaped shoulder 18 is formed adjacent the upper portions of the side plates as shown more clearly in Fig. 4. An internally threaded annular collar 19 (best shown in Fig. 2) is provided with oppositely disposed projecting lugs 20 having arcuate surfaces 21 thereon to engage the arcuate shoulders 18 of the side plates 1.

A hydraulic ram 22 is threaded into the collar 20, and, as best seen in Fig. 1, the ram 22 includes a piston 23 actuated from any convenient source of fluid pressure, such as a hand pump (not shown) through the inlet fitting 24. A plunger rod 25 extending from the piston 23 through the collar 20, has a space 26 affixed thereto by set screws 27. Thus, as the piston presses the spade 26 against the tire, the reacting force urges the arcuate surfaces of the shoulders 18 against the surfaces 21 of the lugs 20 so that the entire force is then exerted against the tire bead. The arcuate surfaces permit flexibility in angular positioning of the piston and spade. A stop screw 28 (Fig. 2) threaded through shoulder portion 18 of one side plate 1, engages recess 29 in one of the lugs 20 of the collar 19. This locks the ram assembly in position so that the rod 25 will draw back into the ram when the pressure on the piston 23 is relieved.

Fig. 3 illustrates the tool in position preparatory to removing the tire bead 30 from the rim. The particular rim structure illustrated comprises a rim base 31 having a gutter edge 32 along one edge, a split lock ring 33, an endless bead seat ring 34, an endless side ring 35 and a resilient sealing element 36 between the bead seat ring 34 and rim base 31. A rim structure of this type is particularly suitable for use with tubeless tires and is now commercially available.

In attaching the tool to the rim the entire ram assembly is removed from the tool by loosening the stop screw 28. The jaws 2 and 3 are then separated sufficiently to permit the chisel-point edges 4 to be slipped over the edge of the side ring 35 in the position shown in Fig. 3. The screw shaft 16 is adjusted by means of handle 17 against the lock ring 33 so that the jaws 3 are substantially horizontal and then the jack screws 7 are turned inwardly so that the chisel-point edges 4 firmly grasp the flange of the side ring 35. The ram assembly is then placed in position with the arcuate surfaces 21 engaging the arcuate shoulders 18. The lock screw 28 is then tightened to hold the ram assembly in position.

Pressure is then applied to the piston 23 to move the rod 25 and spade inwardly against the tire immediately above the bead 30. As the spade moves inwardly to the position where the tip of the spade is free of the side flange ring 35, the entire ram assembly pivots about the arcuate surfaces 18 and 21 to drop down into the position shown in Fig. 1. Fluid pressure is applied until the bead 30 is free of the bead seat on the bead seat ring 34. Pressure is then released and the tool removed from the rim flange and the procedure is then repeated at spaced intervals around the rim until the entire bead is freed from the rim. The same procedure is then repeated on the other bead of the tire on the opposite side of the rim.

As is evident, an extremely stable support is provided to counteract the moving force of the ram acting along the centerline of the ram assembly. Three-point support is effected by each of the clamping jaw pairs and the contact between the screw 16 and the rim. A "tripod" effect is thus achieved to afford safe and efficient bead dislodgment.

While certain representative embodiments and details have been shown for the purpose of illustrating the invention, it will be apparent to those skilled in this art that various changes and modifications may be made therein without departing from the spirit or scope of the invention.

I claim:

1. A tire removing tool for unseating the bead of a tire mounted on a rim having a rim flange with an axially extending peripheral portion comprising at least one rim flange clamp having an upper and a lower rim flange engaging member with each of said members having a gripping edge adjacent one end thereof, spaced side plates, means to mount the flange engaging members between the side plates to maintain said gripping edges of said members in spaced opposed relation, and means engaging the flange engaging members adjacent the ends opposite the gripping edges to controllably move said ends apart and thereby move the gripping edges into gripping engagement with the axially extending peripheral portion of the rim flange; a bead unseating assembly mounted between said side plates cooperating with said rim clamp including a presser member and pressure means to urge the presser member against the bead to displace the bead axially inwardly and away from the rim flange when the rim clamp is gripping the rim flange, the gripping force of the rim clamps being substantially normal to the direction in which the bead moves; and a supporting member adjustably mounted on the rim flange clamp oppositely of the bead unseating assembly and bearing against the edge of the rim to support the tool during the use thereof.

2. A tire removing tool for unseating the bead of a tire mounted on a rim having a rim flange with an axially extending peripheral portion comprising a pair of rim flange clamps, each having an upper and a lower rim flange engaging member with each of said members having a gripping edge adjacent one end thereof, spaced side plates, means to mount the rim flange clamps between the side plates to maintain said gripping edges of said clamps in spaced opposed relation, and means to urge the gripping edges of said rim clamps into gripping engagement with the axially extending peripheral portion of the rim flange; a bead unseating assembly mounted between said side plates and between and above said rim clamps cooperating with said rim clamps, said assembly including a presser member and pressure means to urge the presser member against the bead to displace the bead axially inwardly away from the rim flange when the rim clamp is gripping the rim flange, the gripping force of the rim clamps being substantially normal to the direction in which the bead moves; and a supporting member adjustably mounted between the side plates and below said rim clamps bearing against the edge of the rim to support the tool during the use thereof.

3. A tire removing tool for unseating the bead of a tire mounted on a rim having a rim flange with a peripheral portion extending axially outwardly away from the adjacent portion of the tire mounted thereon, comprising a pair of rim flange clamps, each clamp having a pair of spaced, opposed rim flange engaging members adapted to grip the extending portion of the flange therebetween and means for controllably moving the opposed members toward each other to grip the extending peripheral portion of the rim flange therebetween, and a bead unseating assembly mounted on and cooperating with the rim flange clamps, said assembly including a presser member and pressure means to urge the presser member against the tire bead to move the bead axially away from the rim flange when the rim clamp is gripping the rim flange, the gripping force of the rim clamp being substantially normal to the direction in which the bead moves and being the reacting force to the force of the presser member against the tire bead.

4. A tire removing tool for unseating the bead of a tire mounted on a rim having a rim flange with a peripheral portion extending axially outwardly away from the adjacent portion of the tire, comprising at least one rim flange clamp having a pair of spaced, opposed rim flange engaging members adapted to grip the extending portion of the rim flange therebetween and means for controllably moving the opposed members toward each other to grip firmly the extending portion of the rim flange therebetween, a bead unseating assembly mounted on and cooperating with the rim flange clamp, said assembly including a presser member and pressure means to urge the presser member against the tire bead to move the bead axially away from the rim flange when the rim clamp is gripping the rim flange and supporting means mounted on the rim flange clamp engaging the edge of the rim to support the tool during the use thereof, the gripping force of the rim clamp being substantially normal to the direction in which the bead moves and being the sole reacting force to the force of the presser member against the tire bead.

References Cited in the file of this patent

UNITED STATES PATENTS

| | | |
|---|---|---|
| 1,519,558 | Snider | Dec. 16, 1924 |
| 1,806,947 | Mjelva | May 26, 1931 |
| 1,983,608 | Hand | Dec. 11, 1934 |
| 2,122,388 | Wilkerson | June 28, 1938 |
| 2,495,117 | McCollister | Jan. 17, 1950 |
| 2,581,086 | Edenfield et al. | Jan. 1, 1952 |
| 2,753,923 | Bowyer | July 10, 1956 |